(12) United States Patent
Bergman

(10) Patent No.: US 7,868,814 B1
(45) Date of Patent: Jan. 11, 2011

(54) METHOD FOR TRANSMISSION OF TARGET INFORMATION OVER A NETWORK

(75) Inventor: David R. Bergman, Morristown, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/199,082

(22) Filed: Aug. 27, 2008

(51) Int. Cl.
*G01S 15/74* (2006.01)
(52) U.S. Cl. .............................. 342/45; 342/95; 340/945
(58) Field of Classification Search .................... 342/45
See application file for complete search history.

(56) References Cited

U.S. PATENT DOCUMENTS

| | | | |
|---|---|---|---|
| 5,583,792 | A | 12/1996 | Li et al. |
| 6,338,011 | B1* | 1/2002 | Furst et al. ..................... 701/1 |
| 6,600,737 | B1 | 7/2003 | Lai et al. |
| 7,016,302 | B1 | 3/2006 | Schramm et al. |
| 7,061,860 | B1 | 6/2006 | Calvignac et al. |
| 7,136,360 | B2 | 11/2006 | Voce et al. |
| 7,136,602 | B2 | 11/2006 | Umezawa |
| 7,167,452 | B2 | 1/2007 | Jameson et al. |
| 2003/0218979 | A1 | 11/2003 | Storry et al. |
| 2005/0248480 | A1* | 11/2005 | Butler et al. .................. 342/45 |
| 2007/0002740 | A1 | 1/2007 | Evans et al. |
| 2007/0115848 | A1 | 5/2007 | Chean et al. |
| 2008/0018545 | A1* | 1/2008 | Kaplan et al. ............... 343/713 |

OTHER PUBLICATIONS

In the name of Pedersen, Richard N., U.S. Appl. No. 12/403,733 filed Mar. 13, 2009 entitled "Priority Delivery Apparatus and Method".
In the name of Le, et al, U.S. Appl. No. 12/107,428 filed Apr. 22, 2008 entitled "Adaptive Network Data Shaper".
Van Jacobson, (1995), "Congestion avoidance and control". In proceeding of ACM SIGCOMM, pp. 314-329, New York, NY: ACM press.
Q. K. Shao and H. G. Zhang, (2002), "TCP performance over satellite link".
B. Y. Choi, et al., (2002), "Adaptive random sampling for load change detection".
S. Ma and C. Ji, (2001), "Modeling heterogeneous network traffic in wavelet domain". IEEE/ACM transactions on networking, 9(5).
M. Mandjes, I. Saniee, S. Stolyar and R. Schmidt, (2000), "Load anomaly prediction for Voice over IP traffic". In proceeding of Allerton Conference.
P. Flandrin, (1992), "Wavelet analysis and synthesis of fractional Brownian motion". Information Theory, IEEE Transaction, 38(2).

* cited by examiner

*Primary Examiner*—Thomas H Tarcza
*Assistant Examiner*—Timothy A Brainard
(74) *Attorney, Agent, or Firm*—Duane Morris LLP

(57) ABSTRACT

A data network interconnects ships. At least one ship has sensors which track targets. The data rate over the network is reduced by transmitting hostile target tracks at a greater rate than friendly target tracks, by transmitting hostile target tracks that are closest to friendly assets at a greater rate than hostile tracks at greater distances from friendly assets, andor by predicting the location of a target from old track information previously transmitted over the network, and if the predicted location matches the actual sensed location, transmitting only a track update message, and if the predicted location does not match the actual location, transmitting a complete track update.

15 Claims, 14 Drawing Sheets

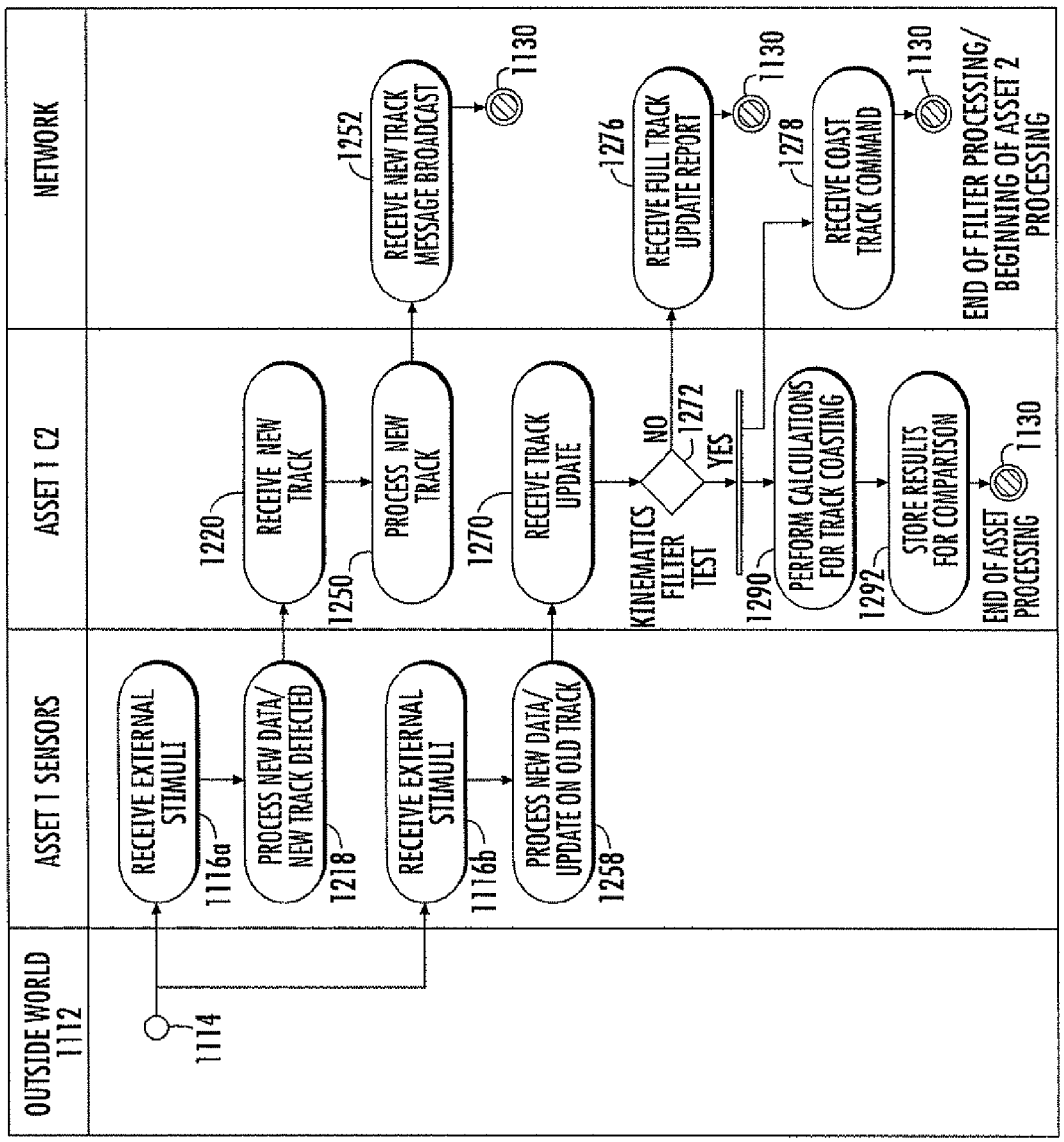

METHOD FOR TRANSMISSION OF TARGET INFORMATION OVER A NETWORK

BACKGROUND OF THE INVENTION

FIG. 1 is a view of a portion 10 of a sea surface 12 in which several platforms in the form of ships are disposed. In FIG. 1, a flotilla 14 of friendly ships includes ships 16, 18, and 20. Ships 16, 18, and 20 each bear sensors, such as radar, infrared sensors, optical sensors, or the like, which sense the presence of the other ships of flotilla 14, and which also sense the presence of aircraft in the vicinity, represented by an aircraft 22. The sensing of aircraft such as 22 by the ships of flotilla 14 is represented in FIG. 1 by "lightning bolt" symbols 24 and 26. The ships 16, 18, and 20 of flotilla 14 communicate among themselves by means of a communication network N, intership portions of which are designated by lightning bolt symbols $N_1$, $N_2$, and $N_3$. Such networks are sometimes known as "tactical" networks. It should be understood that the interplatform or intership network N may include many different signal paths, which variously include digital and analog portions, portions which are encrypted and other portions of which are not encrypted, and which traverse various paths, possibly including a path (not illustrated) extending through a satellite 36.

Each of the sensors of ships 16, 18, and 20 of flotilla 14 makes its own assessment of the sensor signals which its own sensors generate, and distributes the assessed information (or possibly some raw information from some sensors) over the network N among the ships of the flotilla. Thus, each ship of flotilla 14 has access to all the information from the various ships of the flotilla.

From the location of flotilla 14 of FIG. 1, a hostile ship 30 is over the horizon, and therefore may be invisible to the sensors of the flotilla 14. A friendly ship 32 is illustrated as being in the general vicinity of hostile ship 30, sufficiently so that its sensors can sense the hostile ship, as suggested by lightning bolt 34. Friendly ship 32 also senses aircraft 22 as represented by lightning bolt 38.

When friendly ship 32 "joins" the flotilla 14, as by joining network N, it is desirable that the information sensed by friendly ship 32 be made available over network N to the various ships 16, 18, and 20 of flotilla 14, and that the information sensed by the ships of the flotilla be made available to friendly ship 32. When ship 32 joins the flotilla 14, additional "target" information is made available over the network to the various ships. It is desirable to quickly and accurately rationalize the coordinate systems of the flotilla and of friendly ship 32 so that the information which is "new" to each platform can effectively use the information, as by orchestrating a response to the presence of hostile ship 30.

The sensors of the various ships of flotilla 14 of FIG. 1 produce data at a prodigious rate. Radar systems, for example, may recurrently scan hundreds of square miles of surface and the volume above it, producing data, possibly in the hundreds or thousands of megabytes per second. Since the inter-ship network N of FIG. 1, including at least paths $N_1$, $N_2$, and $N_3$, has a finite bandwidth and must handle traffic other than sensor data, congestion can occur in the network. Congestion can, if not controlled, result in failure of the network to convey all of the data to all the nodes in a prompt fashion. In the context of potential warfare, such a failure can cause fatal lapses in data.

One conventional way to moderate the information traversing the inter-ship network N is for the operator of the radar or other sensor to "turn off" one or more targets or categories of targets. For example, in the presence of a great deal of sensor data, he may "turn off" the friendly targets, so that data pertaining to targets deemed friendly is or are not transmitted over the network. Another possibility is to turn off transmission of data pertaining to commercial airflights, as not being of immediate interest. Other classes of targets, or specific targets, can be identified for non-transmission over the network. It will be appreciated that it is possible for targets previously deemed to be friendly to be determined to be hostile, but the blocking of data transmission may inadvertently continue.

Improved techniques for network traffic management are desired.

SUMMARY OF THE INVENTION

A method according to an aspect of the invention is for transmitting target information between or among a plurality of platforms, which platforms may carry sensors, weapons, andor personnel. The method comprises the step of providing a communication network among at least some of the platforms. Sensor data is generated on a first one of the platforms, which sensor data relates to targets in a region about the platforms. For each target sensed, its status as hostile or friendly is determined. Before sending tracks to the other platforms via the communications network, the track data is throttled before being released to the network by adjusting the rate of data transmission. Track information relating to hostile targets is transmitted over the communication network at a first rate or bandwidth. Track information relating to friendly targets is transmitted over the communication network at a second rate or bandwidth, less than the first rate or bandwidth.

A method according to another aspect of the invention is for transmitting target information between or among a plurality of platforms, which sensors may carry sensors, weapons, andor personnel. The method comprises the step of providing a communication network between or among at least some of the platforms. Sensor data is generated on a first one of the platforms, which sensor data relates to targets in a region about the platforms. For each target sensed, its status as hostile or other than hostile is determined. For each hostile target, the distance between the hostile target and any friendly asset is determined. From among the hostile target distances, at least one the targets is identified as being the closest to a friendly asset. Before transmission the system throttles the tracks by applying an update rate which is related to the distance previously determined. Track information relating to the target identified as being closest to a friendly asset is released to the communication network at a first rate or bandwidth. Track information relating to at least some of those of the hostile targets which are other than the closest to a friendly asset are released to the communication network at a second rate or bandwidth, less than the first rate or bandwidth.

A method for transmitting target information between or among a plurality of platforms comprises the step of, on a first one of the platforms, recurrently generating from a local sensor first information relating to the kinematics state, location being one specific example, of at least one target other than the first one of the platforms. A kinematics state may contain location, velocity, acceleration and associated covariance (errors). The method also includes the step of recurrently applying the first information relating to the kinematics state of the one target to a local target location predictor associated with the first one of the platforms, for thereby recurrently generating local target kinematics state predictions. A specific example uses location as a special case of a kinematics state, it being understood that more general cases exist. Each first information is compared with the local target location predictions to generate a difference distance. The difference distance is compared with a threshold distance. If the difference distance is greater than the threshold difference, a track update signal including the most current first information, together with identification of the one target, is transmitted from the first platform to an other platform. If the difference distance is less than the threshold difference, a track coast signal including at least identification of the one target is transmitted from the first platform to the other platform. At the other platform, and in response to receipt of a track update signal, deeming the current location of the one target to be that in the most current first information. At the other platform, and in response to receipt of a track update signal including the most current first information together with identification of the one target, applying the most current first information to a remote target location predictor located on the other platform, to thereby generate remote target location predictions. At the other platform, and in response to a track coast signal identifying the one target, the remote target location prediction is deemed to be the location of the one target.

BRIEF DESCRIPTION OF THE DRAWING

FIG. 14 illustrates logic which is an alternative to the logic of FIG. 13.

DESCRIPTION OF THE INVENTION

According to an aspect of the invention, network bandwidth is limited based on the classification of the target as friendly or other-than friendly.

Figure 1:
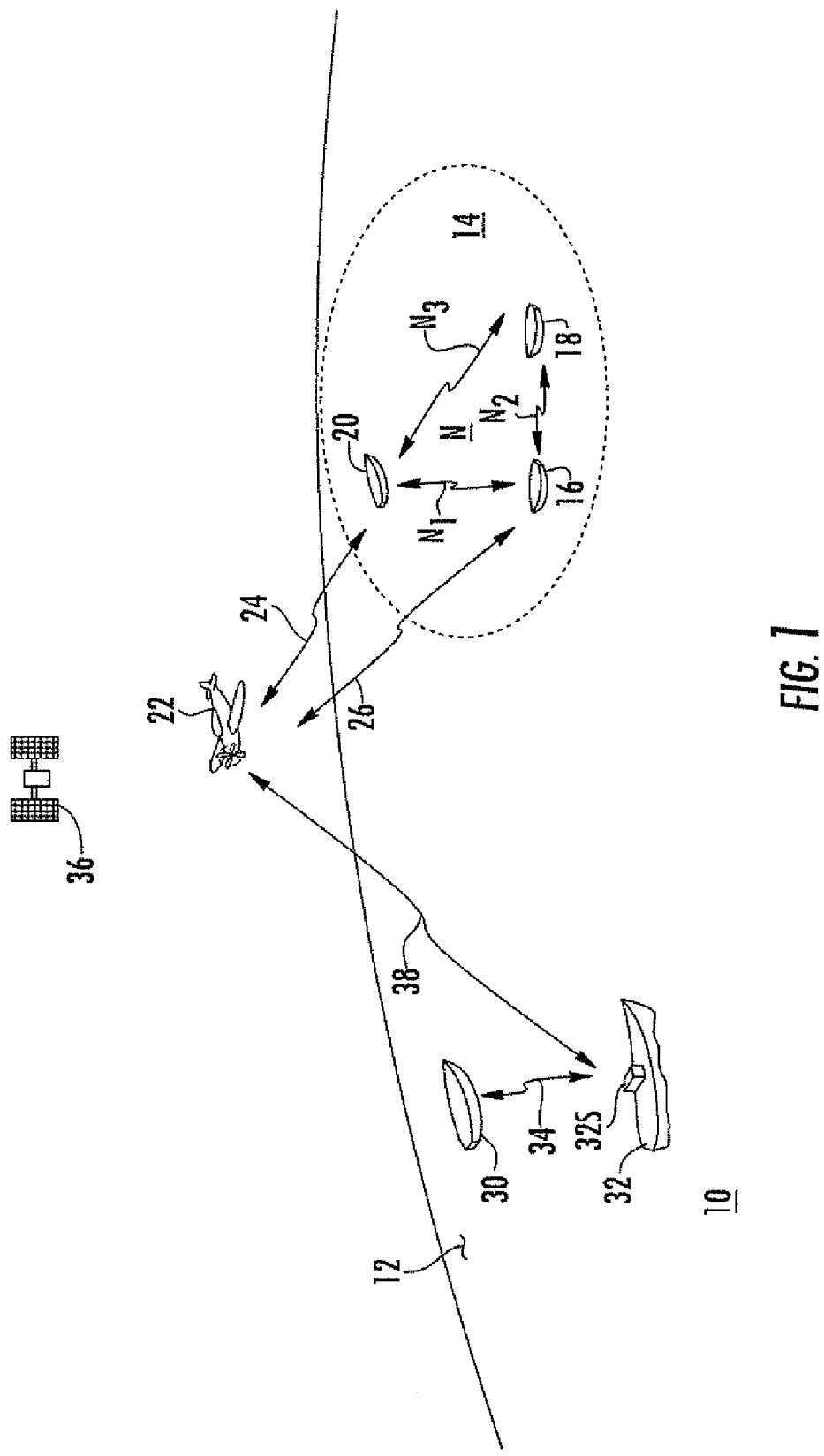
FIG. 1 is a simplified representation of a naval scenario including plural ships and a communication network operating between or among various ones of the ships.
Figure 2:
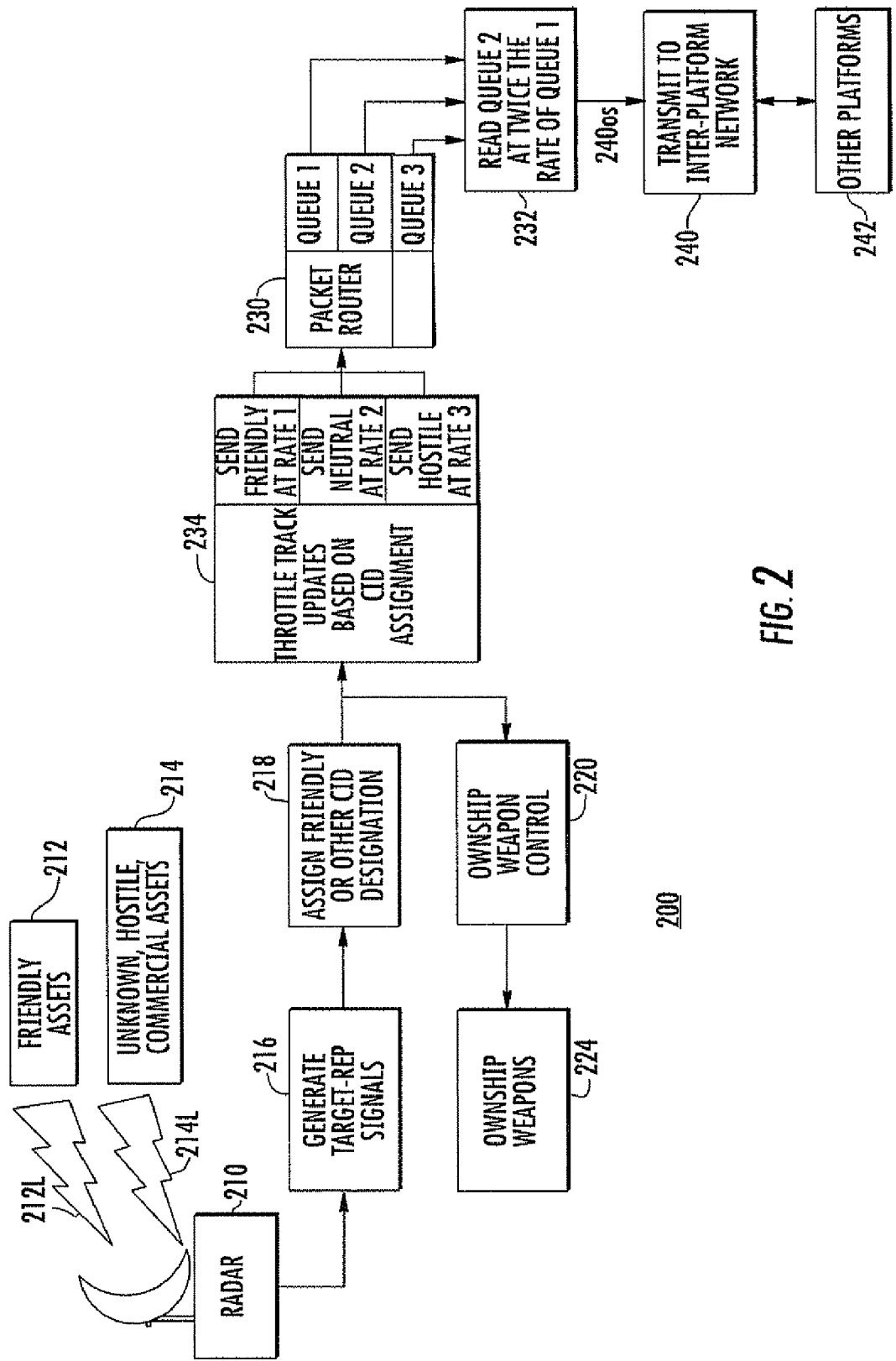
FIG. 2 is a simplified diagram illustrating the processing aboard a ship or other platform for detecting targets, and for designating targets as friendly or other than friendly, and for transmitting other-than-friendly target information over an interplatform network at a first bandwidth, and for transmitting friendly target information at a second bandwidth, less than the first bandwidth.

In FIG. 2, a ship designated generally as 200 includes a sensor, such as a radar system 210. Radar system 210 scans a region of space by transmitting electromagnetic energy thereto, and receives reflections of energy from objects or "targets" in the region searched. The transmitted energy impinges upon one or more friendly targets illustrated as a block 212, and upon other targets designated 214. Each target reflects a portion of the energy that impinges upon it. The transmission and reflection are illustrated in FIG. 2 by "lightning bolt" symbols 212L and 214L, respectively. The reflected or return energy is received by the radar system 210, which generates, in a block designated 216, target-representative signals. These target-representative signals may flow at a rate of several Hz to thousands of MHz, depending upon the number of sensors and their type, and also depending upon the number and complexity of the targets.

According to an aspect of the invention, the various targets are identified as being friendly or other-than-friendly. The other-than-friendly category may include subcategories such as unknown, hostile or neutral (as for example commercial aircraft). The target's status as friendly or other-than-friendly is appended to the target signal, and accompanies the target signal. The designation of a target as being friendly or other-than-friendly may be performed manually by an operator, or automatically in response to Identification Friend or Foe (IFF) signals transmitted by the target. The designation of the target, and the appending of the designation to the target signal or track is illustrated as a being performed by a combat identification (CID) assignment block 218 in FIG. 2.

The target signals, together with their designations, are coupled from assignment block 218 by way of a path 222 to a block 220, which represents the coupling or transmission of the target information to ownship weapons control. As the path 222 is located on the platform 200, it can be a wide bandwidth path, such as one or more dedicated optical fiber paths fully capable of carrying the full bandwidth of the signals produced by the sensor 210. The ownship weapons control block 220 communicates the target information, or so much of it as may be required, to ownship weapons illustrated as a block 224. Ownship weapons 224 are operated to neutralize threats.

It is very desirable that the sensor information produced by sensor(s) 210 of ownship 200 be made available to other platforms, so that they may be apprised of targets which may be beyond the range of the sensors of the other platforms. For this purpose, an interplatform network 240 includes a terminus 240 ownship (240*os*) to which target signals can be applied by ownship 200 for transmission to the other platforms, illustrated as a block 242.

It must be kept in mind that ownship is not the only transmitter on interplatform network 240. Each of the other platforms may also carry sensors which produce information which may be of value to other platforms. Thus, there is the potential for the total sensor traffic on the interplatform network to be very great, and possibly sufficient to cause overload of the network. Network overload may cause loss of some or much of the data or information attempting to pass therethrough.

In order to reduce the traffic transmitted by ownship 200 over the interplatform network 240 of FIG. 2, the target or track information and associated appended friendly/other-than-friendly designation information produced by block 218 is provided to a throttling filter illustrated as including blocks 230, 232, and 234. Blocks 230 and 232 together act to packetize the track information and to route the packets to different queues, designated as Queue 1, Queue 2, and Queue 3, depending upon the assigned CID. Queue reading block 232 reads the queues at different rates, so that the Queue 1, containing known friendly target information, is read least frequently, and Queue 3, containing known hostile targets, is read most frequently. The reading of Queue 2 is at an intermediate rate or frequency. The use of queues and queue readers with different read rates is well known in the art, and results in preferential transmission of the most-favored (most frequently read) packets of data. In this case, the most-favored information is Queue 3, devoted to hostile target information. Thus, packets representing the friendly targets and the other-than-friendly targets are sent to a throttling device, or choke, before being sent to the network router 232. More particularly, the choke 230 contains a rule set which allows track signals to pass at a custom rate based on the designation of friendly or other-than-friendly. While three different queue reading rates are described, more or fewer reading rates may be used. As an example, friendly forces may communicate by a separate network device than that used for data transmission between assets thus eliminating the need to share radar track data between assets. In this case the rate for transmission of these tracks could be set to zero. Additionally once a Neutral commercial air traffic designation has been established for some tracks a data transmission rate of several minutes may be applied to these tracks, thus leaving more network bandwidth available for the transmission of hostile track and update rates comparable to the radar rate (typically once every few seconds to a few times per second). This tends to reduce the amount of bandwidth dedicated to transmission of friendly-target information over the network. Since each platform has information about those friendly targets which its sensors can detect, little functionality is lost by limiting the reporting rate provided for reporting to a platform of what amounts to friendly targets beyond sensor range of the platform. Presumably, the delay occasioned by limiting the bandwidth in the reporting of friendly targets, as to any platform, only delays the reporting of such targets at extreme ranges. The reduced reporting/transmission rate may be achieved within the track database contained within the ship's Command and Control (C2) system before packets are ever sent to a network router queue. A second method would send all packets to the network router queue and have separate queues (one for each type of threat level) with each queue read or accessed at a different rate, more specifically the hostile target queue would be read at a first rate and the Friendly target queue read at a second rate which is less than the first rate. The distinction between these is a matter of implementation and may be chosen based on other constraints on the system. In the latter case, upon being read the queue should pass the most recent updates for each track in queue to the network and delete all other updates from its memory. As a further example, friendly tracks, which pose no threat to other friendly forces, and neutral commercial air track data may be transmitted on the network at lower update rate than received by on board radar.

Figure 3:
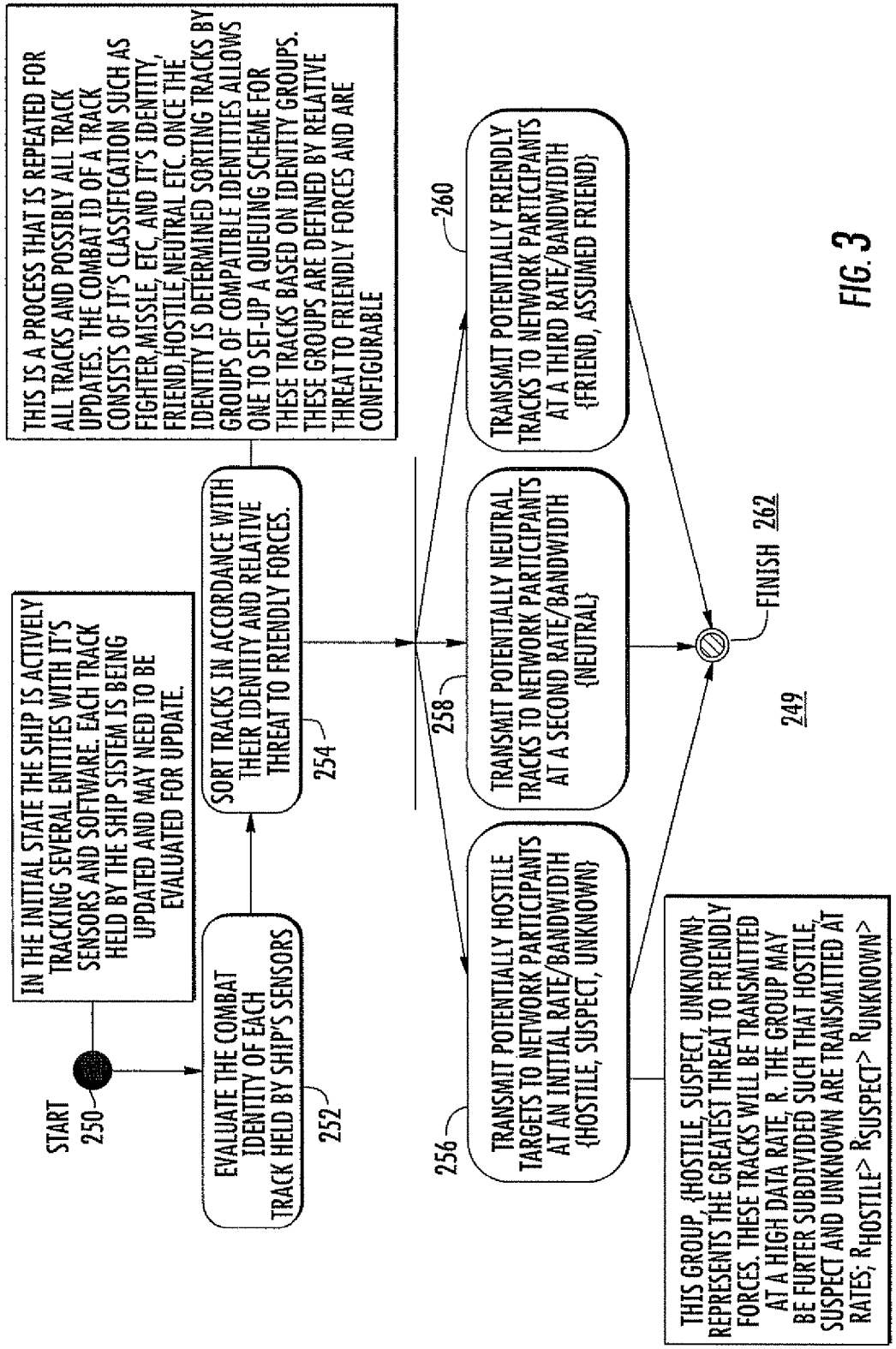
FIG. 3 is a simplified control or logic flow chart or diagram illustrating the performance of tasks in accordance with a first aspect of the invention.

FIG. 3 is a simplified flow chart or diagram illustrating steps of this aspect of the invention. In FIG. 3, the logic 249 begins at a START block 250, which represents the initial state of the ship. The ship is initially actively tracking multiple entities with its sensors and software. Each track held by the ship system is constantly or continually updated. In this context, "held" means capable of being tracked by the ship's sensors. The track information may need to be evaluated or reviewed after each update. From START block 250, the logic or control of FIG. 3 flows to a block 252, which represents the evaluation of the combat identity of each of the tracks held by the ship. In this context, "Combat Identity" of a track includes the classification of the track as fighter aircraft, missile, and the like, together with its status as friendly, hostile, neutral and the like. From block 252, the logic 249 flows to a further block 254, which represents the sorting of the tracks in accordance with their identity, i.e. relative threat to friendly forces. The sorting is performed by grouping the tracks having compatible Combat Identities. From block 254, the control of logic 249 flows, in parallel, to a plurality of blocks 256, 258, and 260. Block 256 transmits the track information of potentially hostile targets (hostile, suspect, or unknown) to network participants at an initial rate R. This is the group that presents the greatest threat to friendly forces. As such, the transmission rate $R_{potentially\ hostile}$ allow for transmission at a high rate or without substantial delay. The group of potentially hostile targets may be further subdivided, if desired, into hostile, unknown, and suspect, and the corresponding data rates may be selected so that, for example, $R_{hostile} > R_{suspect} > R_{unknown}$. Block 258 represents transmission of track information relating to neutral targets to network participants at a second rate or bandwidth, which rate $R_{neutral}$ is less than $R_{potentially\ hostile}$ or any of its components. Block 260 represents the transmission of information relating to friendly tracks to network participants at a third rate $R_{friendly}$, which rate is less than the rate $R_{neutral}$. The logic 249 of FIG. 3 flows to an END or FINISH block 262 from any one of blocks 256, 258, or 260.

According to another aspect of the invention, network bandwidth is limited based on how soon a target may become a threat or how close a target is to other assets in the network.

Figure 4:
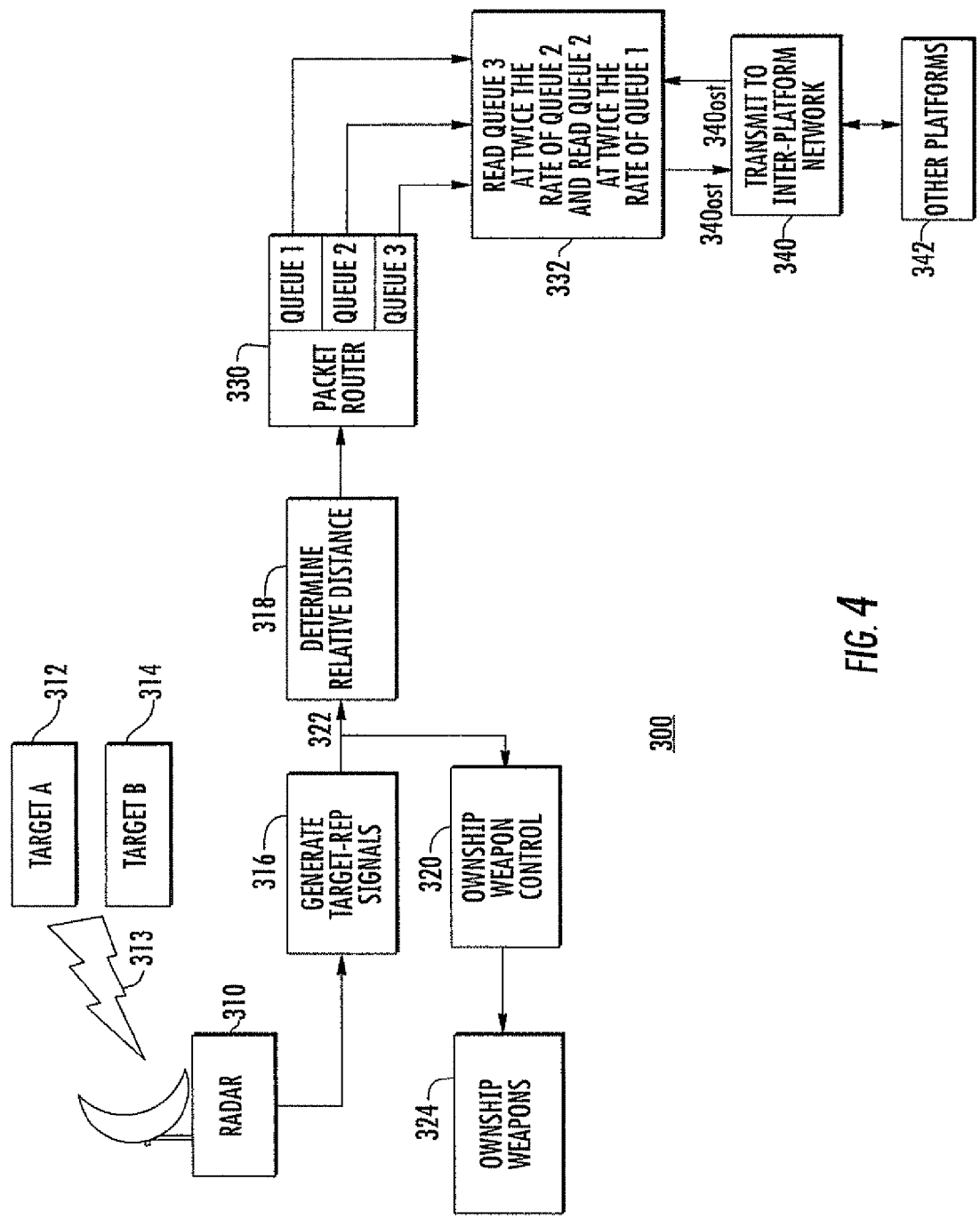
FIG. 4 is a simplified diagram illustrating the processing aboard a ship or other platform for detecting targets, and for ordering the targets in accordance with estimates of the time at which they become threats.

FIG. 4 is a simplified diagram illustrating a platform 300 such as a ship which bears a sensor in the form of a radar 310 for transmitting electromagnetic signals to, and for receiving reflected signals from, remote targets such as 312 and 314. The lightning bolt symbol 313 represents the flow of energy to and from the targets. Radar 310 is associated with a block 316, which represents the processing of the radar signals to generate target-representative signals. The target-representative signals are applied over a bus 322 to a block 320, which represents the ownship weapons control. The ownship weapons control uses the target-representative signals to control weapons 324 for neutralizing selected targets.

Other platforms illustrated together as a block 342 in FIG. 4 may benefit by having available the information from the sensors including radar 310, and an interplatform network 340 is provided, which has an ownship terminus 340ost to which information can be applied for transmission to the other platforms. Interplatform network 340 also defines at least one ownship reception port 340osr by which signals may be received by ownship from network 340.

According to an aspect of the invention, the track or target information with the associated CID from block 316 of FIG. 4 is processed to determine the distance of a hostile target from a friendly asset. Block 318 represents the determination of the distance of each hostile target from each friendly asset. The packet routing in block 330 places the information relating to the hostile target closest to a friendly asset in the queue (Queue 3) which is most frequently read (or read at the highest rate). The next closest target track information is applied to Queue 2, and the next closest to Queue 3. Of course, there may be as many queues as may be desired. Block 332 represents the reading of the most-preferred queues most frequently or at the greatest rate. Thus, the information relating to that hostile target which is closest to a friendly asset is read from Queue 1 at the highest rate or with the greatest frequency, and transmitted over the inter-platform network to other platforms 242. Information relating to a hostile target which is further from a friendly asset is placed in Queue 2, and read less frequently or at a lesser rate than Queue 1, for transmission over the inter-platform network. In a similar manner, track information relating to hostile targets very distant from any friendly asset are applied to Queue 3, and read at a lower rate or less frequently. In this manner, the network bandwidth or data-carrying capacity is skewed in favor of preferring the data likely to be of greatest or greater importance.

Figure 5:
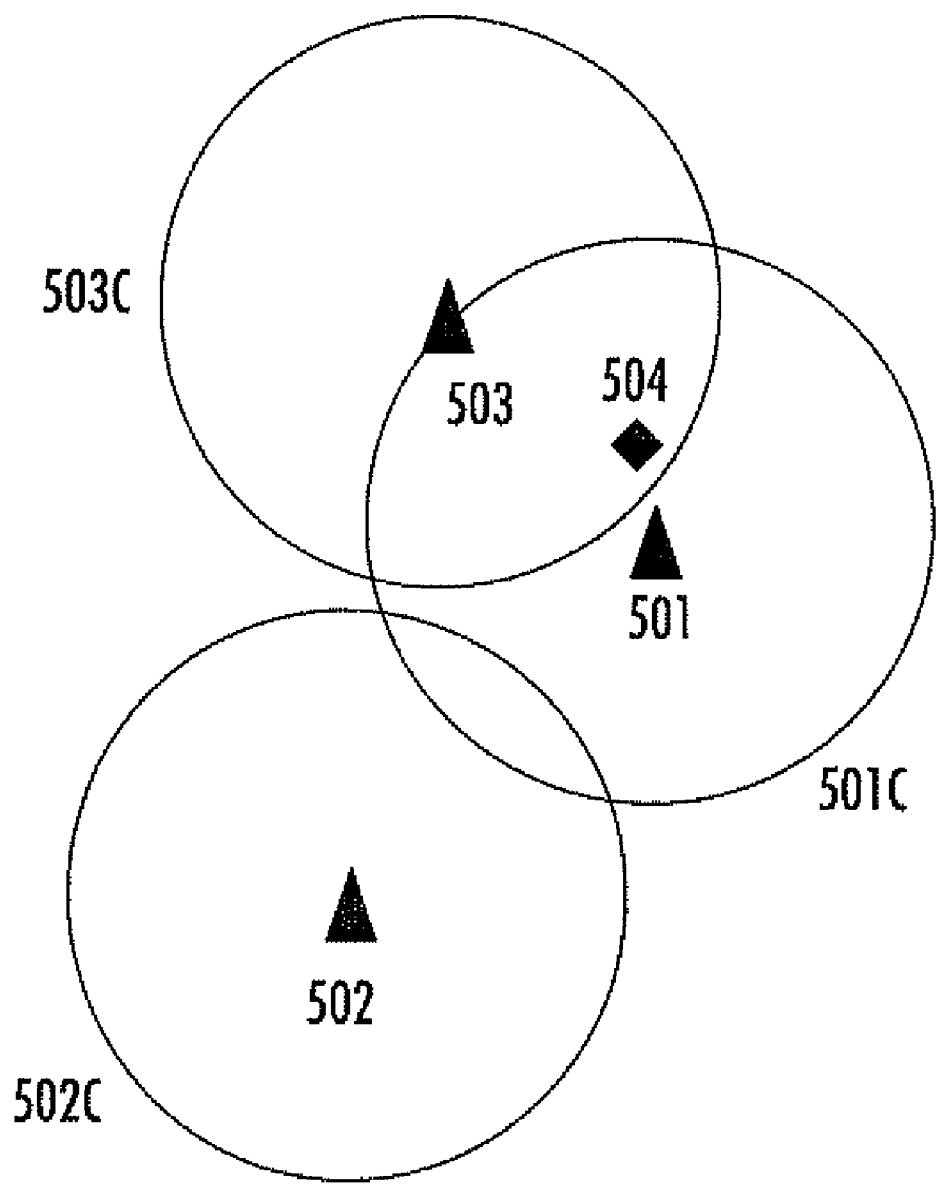
FIG. 5 is a simplified representation of three assets participating in a network and sharing data while a target is being tracked by on board sensors of two of the three assets.

FIG. 5 is a simplified plan view of a portion of the Earth's surface on which the locations of various assets are indicated by symbols 501, 502, and 503. Circles 501C, 502C, and 503C are centered on assets 501, 502, and 503, respectively. These circles represent the maximum range of the sensors on each asset (for example circle 501C is the maximum range of sensors on asset 501). A sensed or tracked target is illustrated by a symbol 504. The tracked target is visible to the sensors on assets 501 and 503 but not to those of asset 502. Each of assets 501 and 503 will share data with each other and with asset 502 via line of sight or satellite communications (or any other communications capabilities).

It is desirable to make a common operational or tactical picture available to each platform. Furthermore it is desirable that this common picture be shared among assets in real time, or near real time. The larger the extent of this common picture the greater the network traffic becomes. It will be understood that approaching real time requires reducing latencies in the broadcast, which means reducing latencies in the network 340. Data may require updating at fast rates for some users, while other users may not benefit from this information and be able to function with slower data update rates. As previously mentioned, while the rate may be throttled, the data sent to the network should be the most recent data received by the reporting asset's sensors. A receiving platform may not need all the data delivered at the same update rate. Consider, for example, two surface platforms or assets separated by about 500 nautical miles (NM) traveling toward each other, each with a speed of 70 knots (kts), which implies meeting at about 3.6 hours. Assume that each platform has a radar or sensor range of about 50 NM. Another small fast-moving surface asset could close the distance in 20 minutes, implying a speed of 150 NM/hr, and a fast-moving aircraft in about 10 minutes (300 NM/hr). Each ship may require track data inside an area with a 500 NM radius for a particular mission.

The method for throttling network traffic according to this aspect of the invention uses a "filter" that imposes a data selection rule in time (i.e. a custom data rate) based on distance or range of the target from a friendly force or occurrence of said data within a geometric region on the earth. This aspect of the invention is referred to as a geometry gate for short and is described in the following paragraphs. In this method, each asset which participates in the network requires knowledge of the locations or placement of all other assets participating on the network, either by direct communications or battle plans, or by preset routes, flight plans, or the like. Each transmitting asset is reporting the tracks that are sensed by its own sensors to the other assets within the network. To avoid flooding the network with excessive information, the reporting asset performs a service for the network by determining whether track updates should be sent to the receivers at a reduced rate when the track is remote in time or distance relative to a or the receiving asset, and at an increased rate when the track is proximate in time or distance to the receiving asset.

Each asset 501, 502, and 503 of FIG. 5 acts as a data server to the other assets depicted in the FIGURE. Although each asset of FIG. 5 includes a server, we focus attention on just one representative asset, namely asset 501, for clarity. Asset 501 of FIG. 5 is serving data to assets 502 and 503. Although the sensor ranges of each asset may overlap, the sensors of asset 501 add value in delivering data to the other network participants in two ways; (1) by extending the effective range of the other assets, as illustrated in FIG. 5, and possibly (2) by providing "better" data to all assets by allowing better resolution of targets. The effect of transmission by asset 501 to asset 502 of data relating to target 504 is to extend the effective sensor range of asset 502. By reference to FIG. 5, it can be seen that target 504 is closer to asset 501 than it is to asset 503. Although asset 503 can track target 504 with its own sensors, the quality of data reported by asset 501 is likely to be better.

Referring again to FIG. 5, target 504 is a greater threat to asset 503 than it is to asset 502, because of its greater proximity to asset 503. According to an aspect of the invention, the data rate that asset 501 uses to transmit to asset 503 data relating to target 504 is higher that that of corresponding transmissions to asset 502. The geometry gate does not use time to intercept network participants to assess data rates.

As previously mentioned, the geometry gate can be used to impose a custom data rate for tracks within any geometry or set of nested geometries. The following is a specific example in which the geometries used are sets concentric circles, one set centered about each asset participating in the network, each circle being defined by a radius or range from said asset. Associated with each asset of FIG. 5 is a map or table containing a sequence of ranges and delay time values, which may be considered to be a filter. An example of such a table might be [(10 NM, 2 sec), (15 NM, 5 sec), (20 NM, 30 sec), (50 NM, 5 min), . . . ]. This is interpreted by the reporting asset according to the following example. Given the location of a receiving asset and the locations of the tracks within the server's database, those tracks within 10 NM from a receiving asset are reported to that asset every 2 seconds while those 50 NM from the receiving asset are reported to that asset every 5 min. Another, equivalent, way to state this is that each time a track update is acquired by the sensors of the reporting asset, the track is evaluated against the filter criteria to determine whether or not it should be transmitted to the receiving assets. Cleary this imposes a processing load on each reporting asset, as it must "think" or process before it sends data. For certain joint forces the available communication bandwidth will be much smaller than the available computational resources, thereby making these techniques appropriate as a solution to the problem. As far as the participating assets on the network are concerned they are sending real time updates via a speedy network connection, only these updates are going to a software application instead of their intended destination. The application then checks the relative distance between each individual track and the destination (asset track) and depending on the result either blocks the update for that track or sends it.

There are many ways to implement the gate described above. Two methods are designated as option A and option B, and both are described in detail. In option A when the gate is opened the last available update is sent out. This is referred to here as the Hold and Release. In Option B the gate opens and lets the very next update go through and is referred to here as the Open Release.

Figure 6:
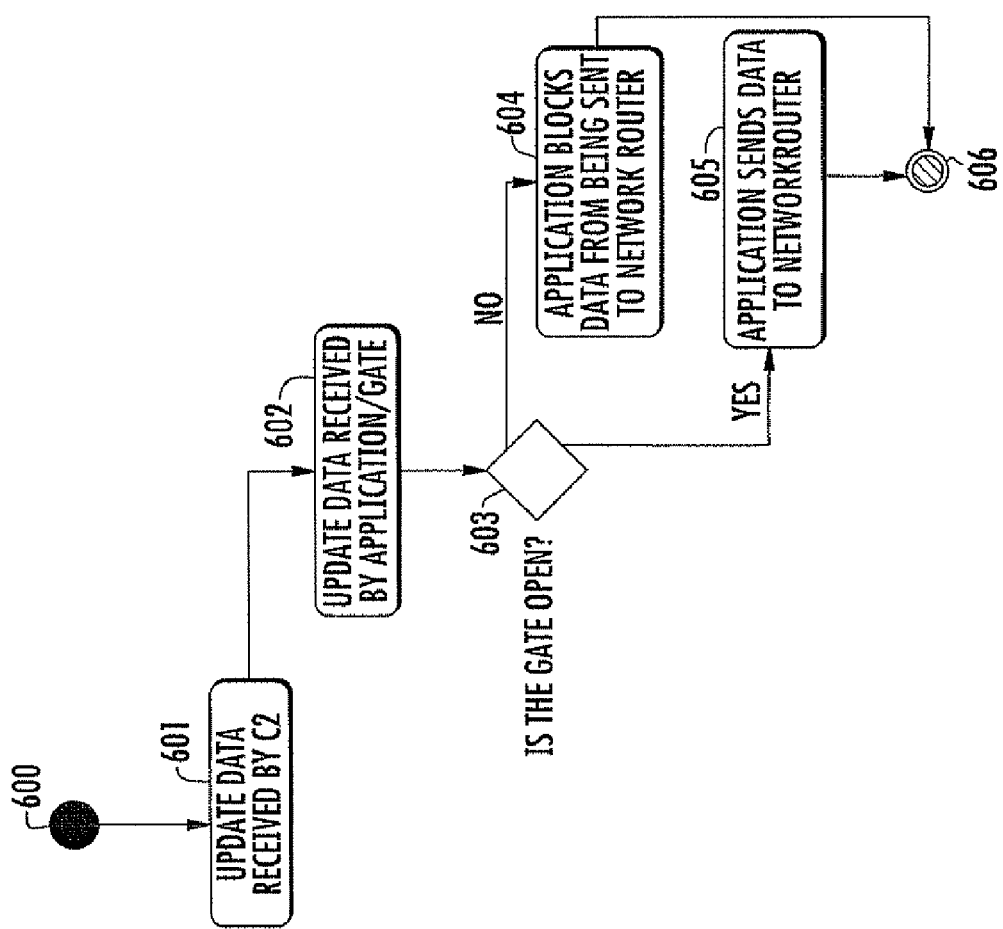
FIG. 6 is a simplified flow chart or diagram illustrating an aspect of the invention in which the transmission of tracks over the network is determined by a gate relating proximity to an asset to the custom data rate latency used to throttle transmitted data.

FIG. 6 illustrates a simplified flow diagram of the basic activity of both types of gates. The starting point 600 is the initial state of the ownship system. New track information comes in from ownship sensors. The logic flow continues to block 601 which represents the receipt of new data, track and otherwise, by ownship C2. This data is then forwarded to the application gate as illustrated in block 602. The updates are throttled by this gate depending on whether or not it is open. The test performed by the gate is represented by decision block 603. If the gate is open when the data is received, that data is passed through to the network/router 605. If the gate is not open when data is received by the application then this data is blocked from transmission on the network, this action being represented by block 604. Once the appropriate decision is made the logic flow is complete and ends at the final state 606, at which point the process repeats when new data is acquired by ownship sensors.

Figure 7:
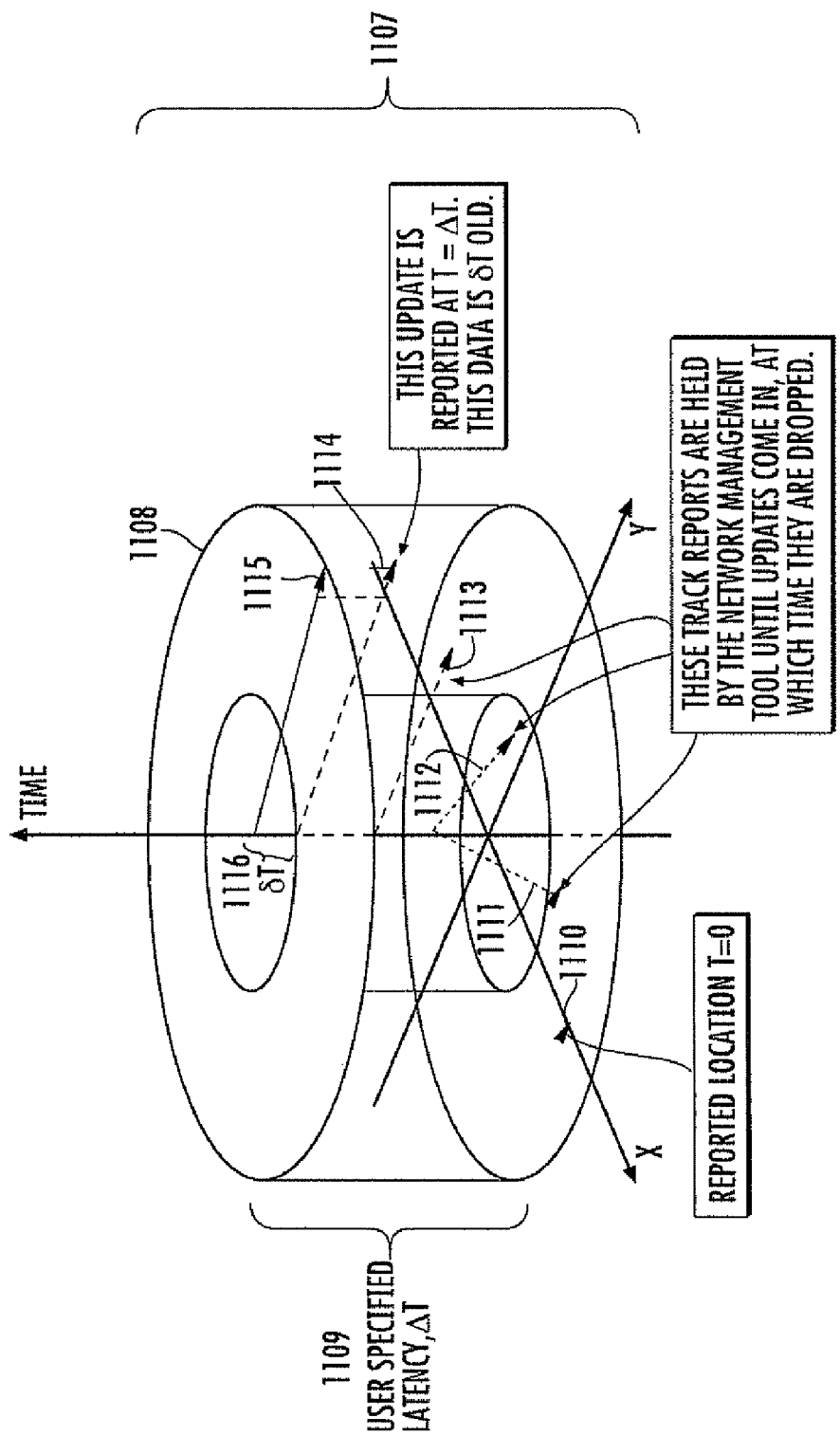
FIG. 7 is a simplified representation in space and time of an aspect of the invention that throttles network traffic based on proximity to other participating assets on the network, and also showing several updates of a single track and the effects of the filter on how those updates are sent to the network.

Option A, Hold and Release is explained by reference to FIG. 7. FIG. 7 illustrates the action of a single element of a geometry gate 1107 in space and time. For purposes of illustration consider tracks being reported by asset 501 of FIG. 5 to asset 502 in FIG. 5. The tracks are being updated by sensors on asset 501 and the gate 1107 represents the desired latency for reporting tracks to asset 502. The gate 1107 of FIG. 7 includes an annulus 1108 and a user specified latency $\Delta T$ 1109. The annulus appears twice in FIG. 7 and the combination of this annulus and latency for a cylindrical structure forms a representation of one cycle of the geometry gate 1107. The process starts at the bottom of the diagram at T=0 when the gate (the lower annulus) was last opened and an update of a track was released to the network. This initial track update is labeled 1110. The gate does not open again until later time $\Delta T$. The open gate at time $\Delta T$ is represented by the upper annulus of FIG. 7. During the time interval T=0 to T=$\Delta T$, four more updates are received by ownship's sensors, represented in FIG. 7 by the triangles labeled 1111, 1112, 1113 and 1114. When the time ($\Delta T$) comes to release these tracks the gate releases the most recently received update, which in this case is track update 1114. The reporting asset, 501, does not send three of these reports, 1111, 1112, 1113, but sends the fourth, and most recent, report, 1114. In the method described here, the Hold and Release, this track update occurred slightly before the opening of the gate, by an amount of time $\delta T$, represented in FIG. 7 as 1116. Hence asset 502 receives a track update that is $\delta T$ old, i.e. the update occurred $\delta T$ units of time before the gate opened and hence before it appeared on the receiver's tactical picture. It may be desired to correct for this latency by artificially shifting the track data forward by an amount $\delta T$ to create an artificial update represented by triangle 1115 in FIG. 7. This action may be performed by either the sender or receiver.

Figure 8:
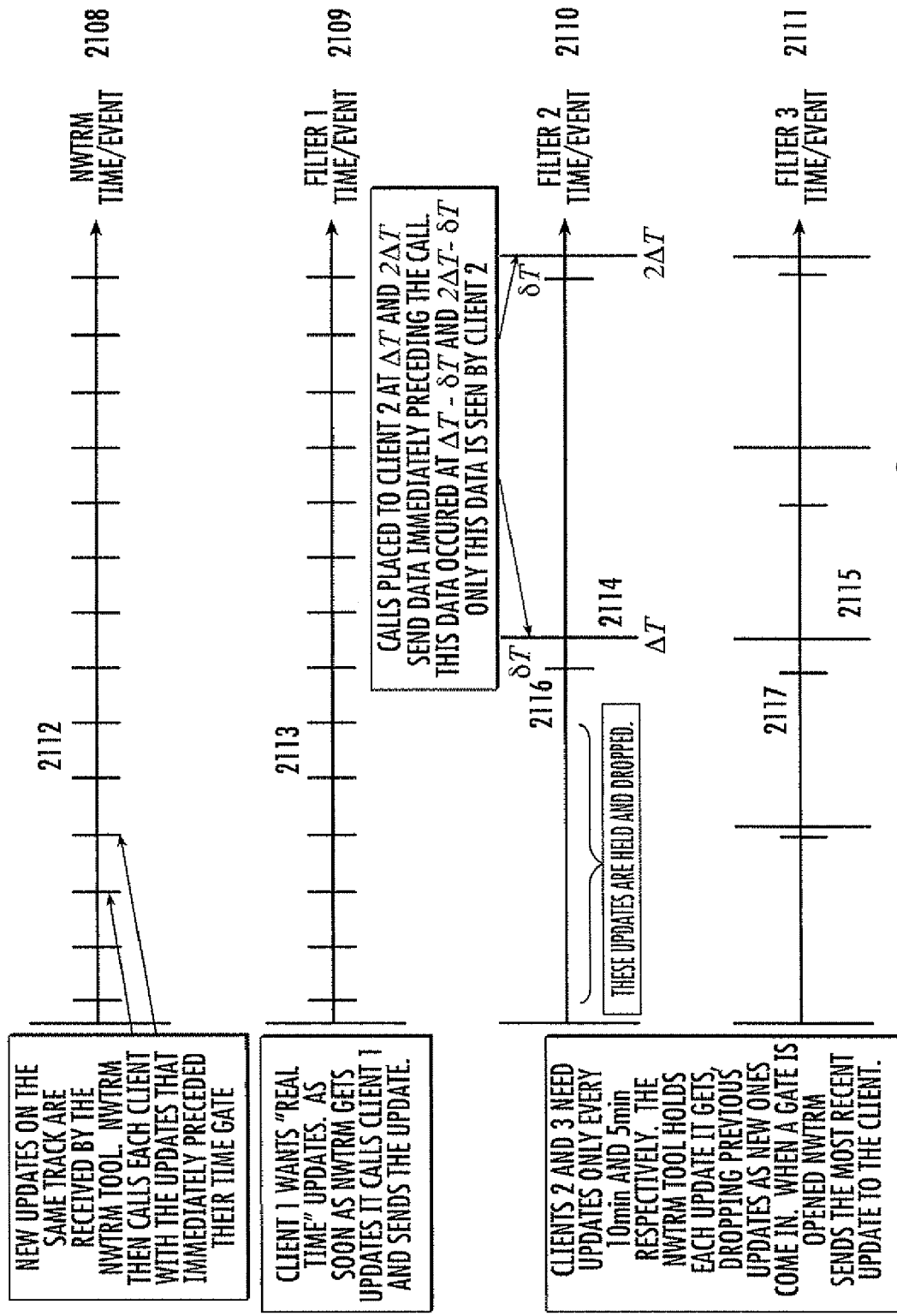
FIG. 8 is a set of timelines illustrating the throttling effect of the filter described in FIG. 7 on multiple users.

FIG. 8 illustrates the differences in track picture as seen by multiple users. FIG. 8 consists of four event timelines labeled 2108, 2109, 2110 and 2111. Timeline 2108 represents the track updates received by the throttling application (named Network Traffic Management Tool or NWTRM in FIG. 8) of the transmitting asset (represented by block 602 of FIG. 6). These update events are collectively labeled 2112 in FIG. 8. In time line 2108, new updates relating to the same track are received by the NWTRM. NWTRM then calls each client or asset with the updates that immediately preceded their time gate.

In FIG. 8, timelines 2109 through 2111 represent geometry gates for transmission to three other assets. Timeline 2109 relates to a situation in which the client or receiving asset wants real-time updates. Timeline 2109 indicates that the gate for filter 1 is always open and that the transmitting asset is to immediately send all updates to that receiving asset. Timelines 2110 and 2111 of FIG. 8 relate to clients, for example clients 2 and 3, which require track updates only every 10 minutes and 5 minutes, respectively. In these timelines, the NWTRM of the sensing asset holds each update it receives, dropping previous updates as new updates become available. When a gate is opened, the NWTRM of the sensing asset sends the most recent update to the client. Timeline 2110 indicates that the gate is open at specific times $\Delta T$, represented as line 2114, and 2 $\Delta T$. When the gate of filter 2 is opened at event 2114 update 2116 is sent on the network to the asset using filter 2. Similarly, when the gate of filter 3 is opened at event 2115 in timeline 2111, update 2117 is sent on the network.

Figure 9:
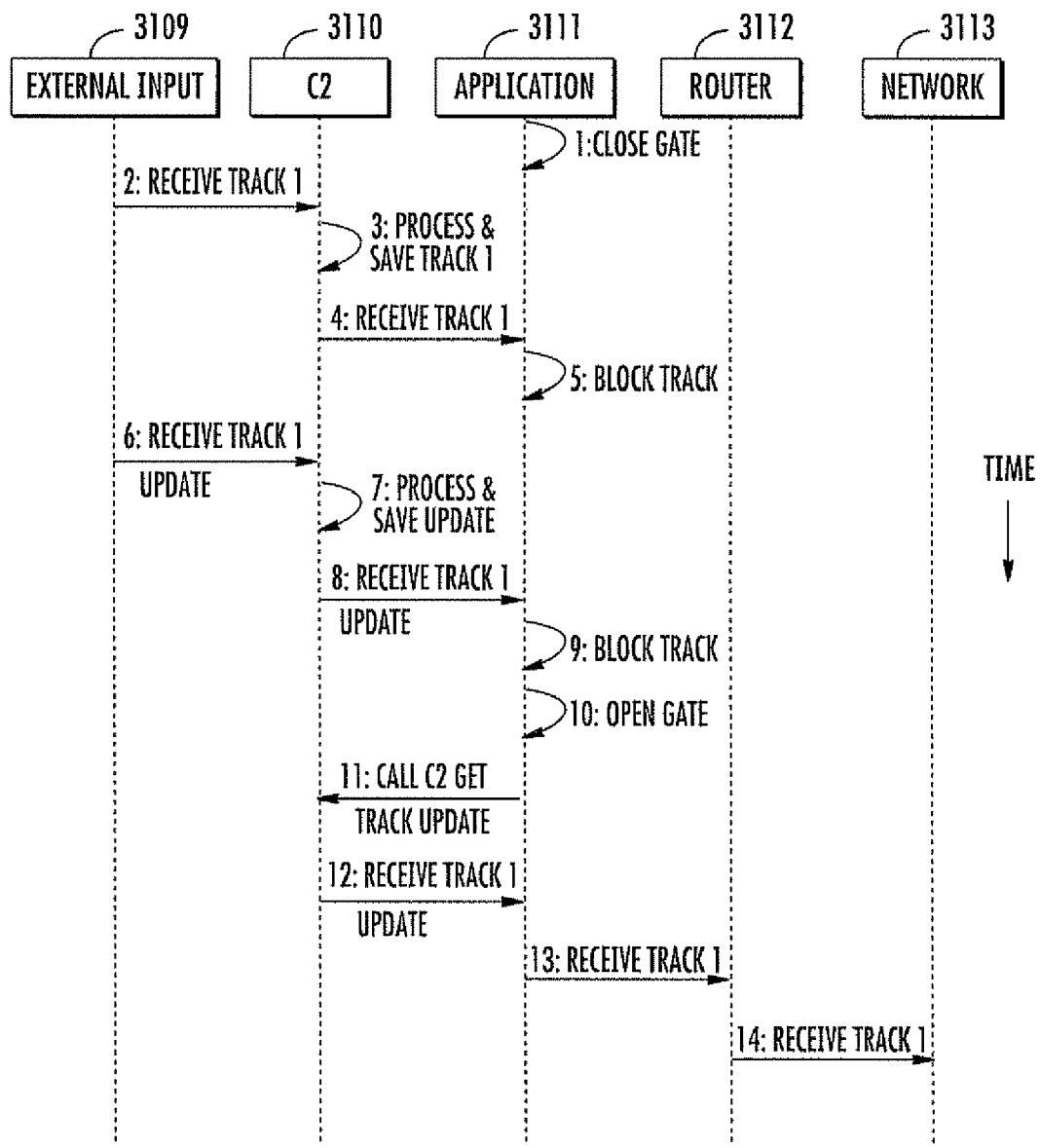
FIG. 9 is a simplified logic sequence diagram showing some details in the processing of the aspect of the invention that throttles network traffic based on proximity.

FIG. 9 is a simplified sequence diagram illustrating some of the details of each block in FIG. 6 in a time ordered sequence. In this diagram, time increases from top to bottom. The application, represented by "swim" lane 3111, performs action 1: close gate. After the time of action 1 the C2 system, represented by swim lane 3110, receives a track from external input, as suggested by action 2 in swim lane 3109. C2 processes and stores that track in its database (action 3) and sends the information to the Application (lane 3111), event number 4. At the time represented by event 4, the gate of the Application is closed, and has been closed since the time of event 1. Since the gate is closed at the time of event 4, the Application blocks the track from transmission onto the network, swim lane 3113, as represented by action number 5. Some time after event 5, C2 receives an update on the previously received track, processes that update, stores it and sends the information of that update to the application, represented by events 6, 7, 8 and 9 respectively. Again, since the gate is closed, no information is sent on the network via the router 3112. After the time of event 9, the application opens the gate, action 10, after which the application calls C2 to get the most recent update stored in its track database, action 11. Once the application receives this data (action 12) the data is forwarded to the router (action 13) and then to the network (action 14).

Figure 10:
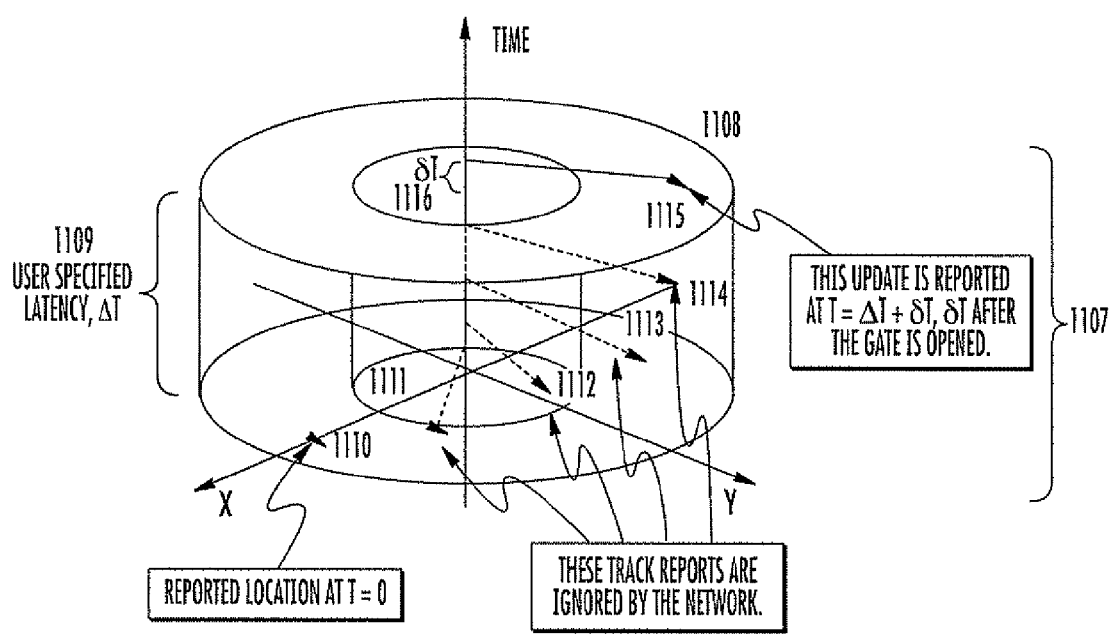
FIG. 10 illustrates another implementation of the aspect of the invention described in FIG. 7.

The Option B Open Release method for implementing the geometry gate is described in conjunction with FIG. 10. FIG. 10 is generally similar to FIG. 7, and is labeled in a similar manner. The steps associated with the open release method associated with FIG. 10 are identical to those described in conjunction with FIG. 7 until the gate is opened for a second time. In the arrangement of FIG. 10, instead of retrieving track update 1114 this gate simply stays open until track update 1115 is reported by the C2 system 601 of the transmitting asset to the application and consequently the router and network. Hence the update represented in FIG. 10 by triangle 1115 is a true sensor update. Once this update is reported at a time $\delta T$, 1116, after the gate is opened the gate is immediately closed for a time interval $\Delta T$, 1109.

Figure 11:
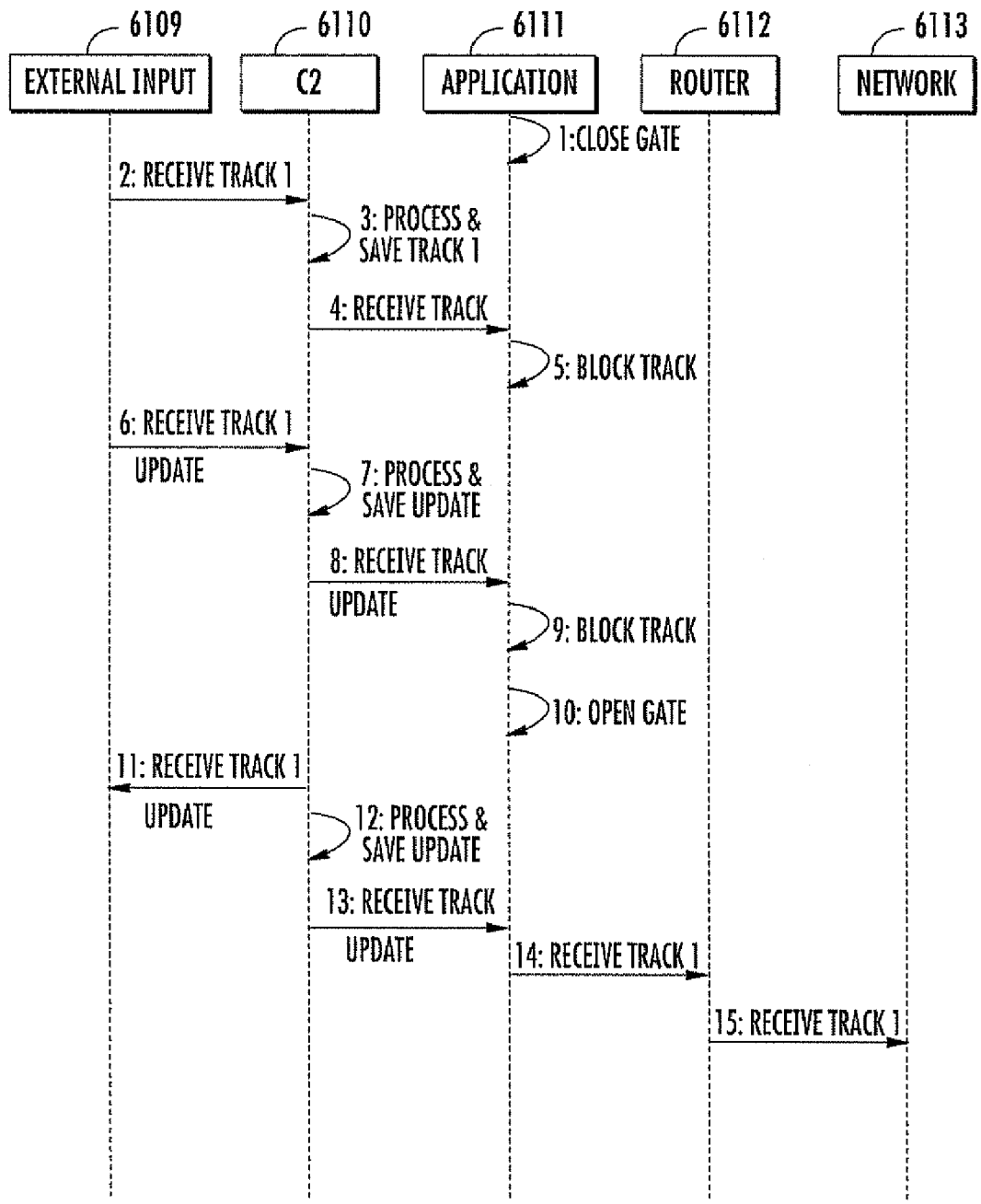
FIG. 11 is a simplified sequence diagram showing some details of the processing involved in the implementation described in FIG. 10.

FIG. 11 is a simplified sequence diagram similar in nature to that described in conjunction with FIG. 9. All actions in the arrangement of FIG. 11 are identical to those described for FIG. 9 up to event 11. In short, the Application (swim lane 6111) closes the gate (action 1), and thereafter the external input (swim lane 6109)transfers a track, designated as Track 1, to C2 in swim lane 6110. Action 3 is processing and saving of track 1 information by C2, after which the saved track is transferred to the Application (action 4). Since the gate is closed at the time of the transfer, the track is blocked (action 5). At a later time, the external input receives a track 1 update (action 6) which is transferred to C2, processed (action 7), and sent on to the Application (action 8). The Application continues to block (action 9). At a later time, the Application opens the gate (action 10). After the Application, swim lane 6114, opens its gate (action 10) the system waits until a new update is received from an external input or sensors (action 11), and is transferred to C2 for processing and saving (action 12). C2 processes and save this update before forwarding it to the application, events 12 and 13 respectively. Since the gate is open, the application immediately forwards the update to the network router, swim lane 6115, and then onto the network, swim lane 6116, events 14 and 15 respectively.

According to another aspect of the invention, network data is throttled based on the ability of a member of the network to correctly determine the location of a target based on information already transmitted.

According to a further aspect of the invention, target location data is transmitted over the inter-platform network at a given data rate if the kinematics state of the target cannot be correctly determined from previously broadcast information, and the target kinematics state data is transmitted at a second data rate, less than the first data rate, if the target kinematics state can be correctly determined (within some set of thresholds) from data already broadcast. The term "kinematics state" generally refers to the position, velocity, acceleration and associated covariance (errors) of a track. An example of target kinematic state would be track location and velocity.

Figure 12:
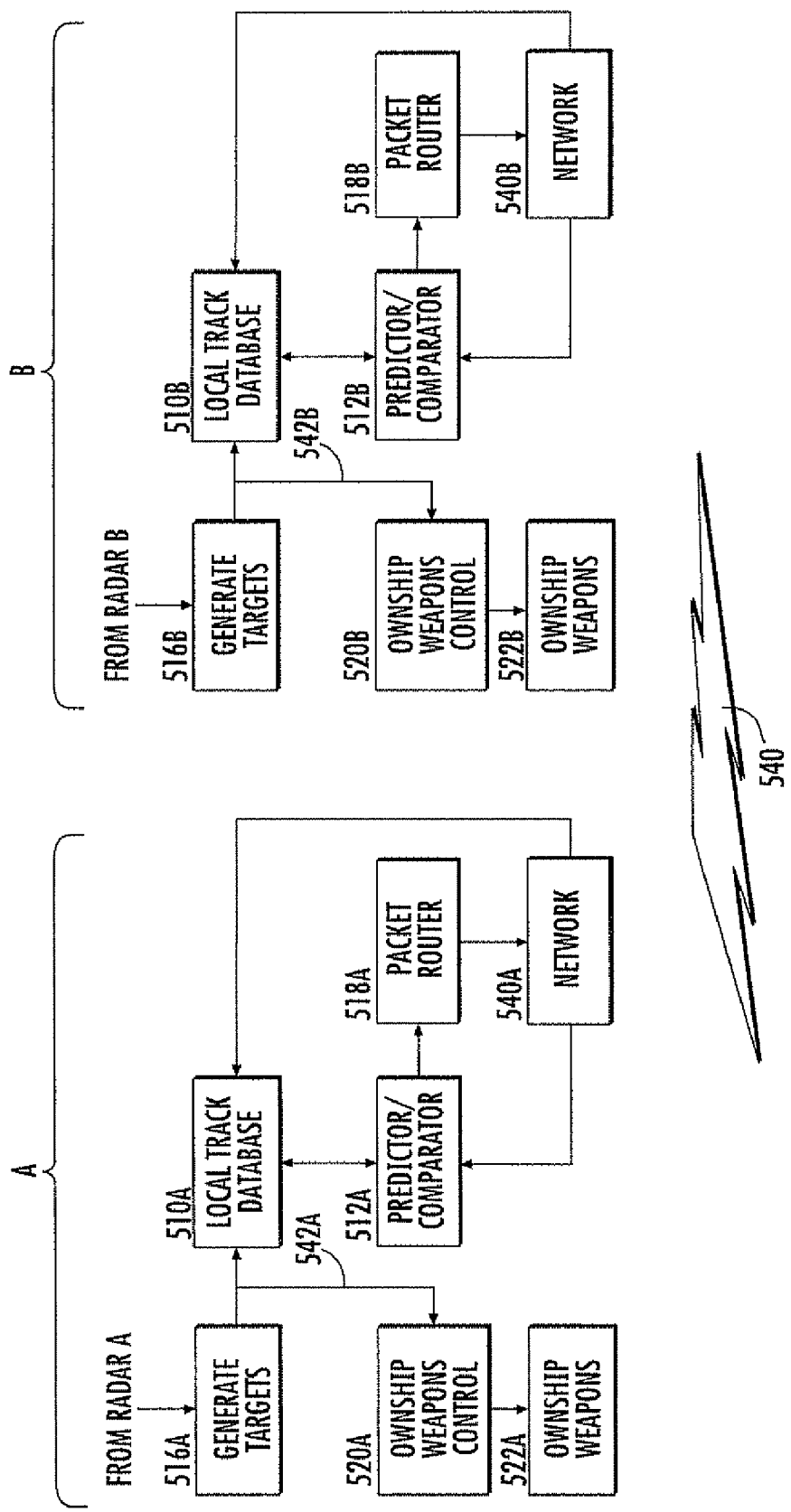
FIG. 12 is a simplified representation of two assets communicating on a network and sharing data which is throttled by an aspect of the invention which uses a predictor method to throttle network traffic.

FIG. 12 is a simplified diagram of a pair of platforms at disparate locations. In FIG. 12, a first platform is designated A, and a second platform is designated B. Corresponding elements of platforms A and B are designated by the same reference numerals with an A or B suffix, as appropriate. Platform A of FIG. 12 includes a block 516A, which represents the receipt of reflected signals from a radar (not illustrated) and the generation of target-representative signals, thus corresponding to block 216 of FIG. 2 or block 316 of FIG. 4. The signals generated by block 516A are provided to an ownship weapon control system illustrated as a block 520A, which controls ownship weapons illustrated as a block 524A. The signals generated by block 516A of FIG. 12 are processed to determine what information should be sent over an interplatform network 540, which has an ownship portion 540A. The processing is aided by a target kinematics state predictor illustrated as a block 512A. A comparator illustrated as a block 510A receives the actual or current kinematics state of each target from block 516A, and compares the current actual kinematics state with the predicted kinematics state to produce a difference (more generally a set of differences, one for each variable in the kinematics state), and compares the difference with a threshold. If the difference is less than the threshold, that means that the information already available to all assets by previous broadcast over the network 540, when applied to the kinematics state predictor, is substantially the same as the actual kinematics state as established by the local sensor (the radar). On the other hand, if the difference is greater than the threshold, the current kinematics state of the target in question, as determined by the local sensor, differs from what can be predicted from the previously broadcast information. In the second event, that the difference is greater than the threshold, comparator block 510A marks the actual current kinematics state data with an indication that it represents a full update of the kinematics state, and forwards the full update data to a packet router 518A. If comparator 510A determines that there is little difference between the predicted and actual kinematics state of the target, it generates a "track coast order", a special message with minimum information necessary to alert other assets on the network that previously received data may be used with the predictor to reconstruct the update. More particularly, the track coast signal contains a header identifying the reporting platform or asset, the time, data identifying the target (for example, network track number) and a "coast" instruction. The track coast signal is intended to instruct other platforms that the last full track data should be applied to a location predictor to determine the current location of the target.

By construction the track_coast_order message is very small, a few bytes, compared to the full track data message, which may be several kilobytes. Standard protocols call for stale tracks to be deleted. Stale tracks are tracks that have not been updated by an external source or organic sensor after some time. Therefore it is just as important that these coast_track_order messages be sent at the same data rate as ordinary updates. Hence this aspect of the invention does not attempt to throttle the two varieties of updates by different queue reading rates. Rather, this aspect of the invention attempts to manage the use of bandwidth on the available network by reducing the size of data and amount of data sent to only that which is needed to manage a reasonable tactical picture. If the coast_track_order messages are not received in a timely manner there is a possibility that those track will be dropped by the other assets in the network.)

On platform B of FIG. 12, the same procedure is followed to transmit over the local network portion 540B either track coast signals or full update signals. When full update signals are received at any platform, the local track database is updated with this information. Thus, receipt of a full update at network portion 540B results in storage of the full update in local track database 514B. Similarly, should platform B transmit a full update, those platforms receiving the full update, including platform A, will store the full update information in their local track database (in memory 514a in the case of platform A).

In the case of a target newly identified, there will be no corresponding location stored in any track database. When the difference is taken, the difference is deemed to be large, so that a full update is broadcast over the network 540 of FIG. 12. Consequently, each platform has full updates for all targets, although some of the full updates may be old. By operation of the system, any old update for which a current location is sensed will be updated if the predicted location is too far from the currently sensed position. Thus, the current location of any target can be determined aboard any platform by looking at the last (or last few) full updates, and applying the information to a location predictor (512A or 512B). Since the predictors aboard all the platforms have the same characteristics by design, their predictions will be the same. The current position of any target for which an actual local sensing is not currently available is determined by applying the old track information to the predictor. If actual sensed information is available aboard a platform, it can be supplemented with the predicted information.

Thus, each platform continually has access to current data identifying the locations of the various targets. Locally sensed data may be available on each platform from its target representative signal generator (516A, 516B of FIG. 12), or from its predictor (512A, 512B), or both. Local weapon control (516A, 516B) on each platform may receive the locally sensed target location signal or, by way of paths 542A, 542B, the locally predicted target locations based on the network broadcasts.

The logic of location predictors 512A and 512B of FIG. 12 is based on the premise that for at least some targets or under some circumstances, it is easy to predict the future location. A particular target may not be moving relative to the platform or ship, or its motion (within some error tolerance range) may be kinematically trivial, as for example straight-line motion at constant velocity, uniform circular motion, or geodesic motion. Under typical circumstances some of the targets or objects being tracked will be traveling for significant times at slow to moderate speeds along straight lines or geodesic paths. Any platform or ship can determine locally if the track kinematics are trivial, and if they are determined to be trivial to send the coast_track_order message to the other platforms or assets. When received, this coast track order indicates that the last reported track data should be used to predict the new position of the target using a standard set of kinematic equations. Depending upon the type of motion being "coasted," the receiver could use either the last true data or predicted data. In the case of trivial motion the choice will not matter, so the last real data should be used.

Figure 13:
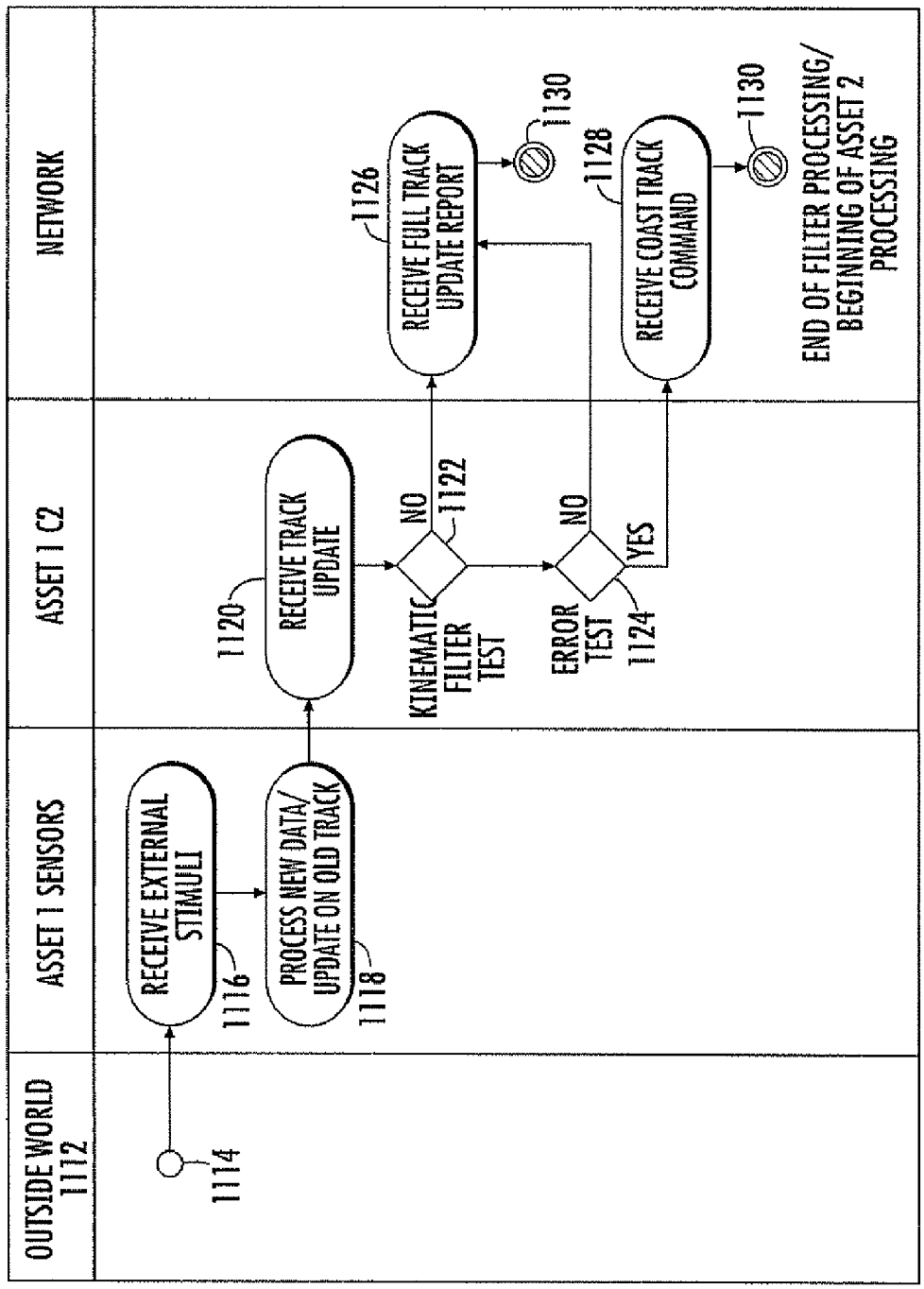
FIG. 13 is a simplified logic or control flow diagram or chart illustrating the operation of an arrangement for sending either full track updates or coast commands.

FIG. 13 is a simplified logic or control flow diagram or chart illustrating the operation of an arrangement for sending either full track updates or coast commands. In FIG. 13, the outside world (column 1112) produces a stimulus 1114, which proceeds 1116 to a sensor of asset 1. The received stimulus, whether new data or an update of an old track, is processed 1118. The track update is transmitted on asset 1 to the command and control (C2), where a block 1120 receives the update or new track. The information is provided to a kinematic filter test decision block 1122 on asset 1 to determine if the location can be predicted from prior information. If the location can be predicted, the logic leaves decision block 1122 by the NO output, and the logic flows to a block 1126, representing the transmission of a full track update by way of the network to the other assets. If decision block 1122 decides that the current location of the track can be determined from prior data, the logic leaves block 1122 by the YES output, and flows to an error test decision block 1124. Block 1124 determines if the error is less than a given amount. If the error is small, the logic leaves decision block 1124 by the YES output, and flows to a block 1128. Block 1128, represents the transmission of a coast command over the network, which commands the recipients to use their estimation procedure to determine the current location. If the error is large, the logic leaves decision block 1124 by the NO output, and flows to block 1126 for transmission of a full update. The logic of FIG. 13 ends at a STOP block 1130.

The logic of FIG. 14 is an alternative to the logic of FIG. 13. In FIG. 14, elements corresponding to those of FIG. 13 are designated by like reference alphanumerics. In FIG. 14, the outside world 1112 produces a stimulus 114, which flows to a receiver block 1116*a*. Block 1218 represents the sensing or detection of a new track, block 1220 represents the receipt of the new track by C2 of asset 1, and block 1250 represents the processing of the new track. Block 1252 represents the transmission onto the network of a broadcast message identifying a new track, which is accompanied by the new track information.

In the case of an update to an old track, the logic of FIG. 14 receives the update at a block 1116*b*, and processes the new data on the old track in a block 1258. The command and control (C2) portions of asset 1 receive the track update (block 1270. A kinematic filter test is applied in decision block 1272. If the correct track location cannot be determined from previously transmitted information, the logic of FIG. 14 flows by the NO output to a block 1276, representing the transmission of a full track update onto the network. If the decision by block 1272 is that the track location can be determined from the previously transmitted data, the logic leaves decision block 1272 by the YES output, and flows to blocks 1278 and 1290. Block 1278 represents the transmission over the network of a coast command. While many types of coasting calculations are contemplated, one possible embodiment is linear coasting. Block 1290 represents the calculations for track coasting, and block 1292 represents the local storage of the results for comparison with later updates. Linear track coasting may be understood by noting that typically all that is known about the track is the location and velocity. Given this information, coasting is the linear extrapolation by a certain amount of time. This linear extrapolation provides a new track position and associated error which is compared to the current sensor updates.

A notional algorithm for linear coasting is given here. This algorithm would serve as the contents of block 512A and 512B in FIG. 12. Standard equations describing the kinematics of a body moving with constant velocity may be found in any physics book, and are descried here for completeness. In Cartesian rectilinear coordinates the position of a body at an arbitrary time is labeled $(X(t), Y(t), Z(t))$ and the velocity as $(V_x, V_y, V_z)$. Upon receipt of the initial track report from the sensor the reported position and velocity are labeled the initial position $(X_0, Y_0, Z_0)$, and velocity $(V_{x0}, V_{y0}, V_{z0})$. Assuming linear motion as the criteria for suppression of data the future location of that track is modeled by $(X(t)=X_0+V_x t, Y(t)=Y_0+V_y t, Z(t)=Z_0+V_z t)$. An update on that track is received some time interval, $\Delta T$ after the initial report. The new track location and velocity provided by the sensor are labeled $(X_1, Y_1, Z_1)$ and $(V_{x1}, V_{y1}, V_{z1})$. The linear coasting formula applied to the initial track location gives $(X_0+V_{x0}\Delta T, Y_0+V_{y0}\Delta T, Z_0+V_{z0}\Delta T)$ as a prediction of the track location reported in the update based on past information. Since this model is a constant velocity model the first condition applied to the track data is $|V_{x0}-V_{x1}|<E1$ and $|V_{y0}=V_{y1}|<E2$ and $|V_{z0}-V_{y1}|<E3$ where the vertical bar pairs |...| represent the absolute value and E1, E2 and E3 are configurable thresholds. The first condition simply states that the updated velocity vector should point in the same direction and is of the same size as the initial velocity vector. Ideally they should be exactly the same but sensor noise and track filter noise will introduce a certain amount of error in the data, hence even if the true motion were ideal the updates would not be expected to satisfy the hard condition $V_{x0}=V_{x1}$, etc. The thresholds are set such that the initial and updated velocities are required to be approximately close in value to be considered the same. If the track update passes the first condition a second condition is applied to the track data as follows $|X_0+V_{x0}\Delta T-X_1|<E4$ and $|Y_0+V_{y0}\Delta T-Y_1|<E5$ and $|Z_0+V_{z0}\Delta T-Z_1|<E6$ where the vertical bar pairs |...| represent the absolute value and E4, E5 and E6 are configurable thresholds. The second condition states that the updated position can be predicted from the initial position to within an error determined by the thresholds E4, E5 and E6. If the first condition is not satisfied the second condition should not be checked. The second condition can lead to false positives without the first condition being satisfied. If both conditions pass then the track update need not be transmitted on the network and a coast_track_order message can be sent to all network participants. Upon receipt of this order each network participant would apply the same predictor equation to the initial data. In general the reporting (or transmitting) asset may need to keep track of the predictions made by the predictor when more sophisticated models are used. The process is repeated and as long as the sensor reported updates match the predicted updates within the defined thresholds no real track data is transmitted on the network. Once a sensor update is received that fails to fit the predictor model that update is sent on the network and used to initialize the predictor for comparison with future updates. All information derived from the previous initialization may be flushed from memory as it is not used by the predictor.

Block 1278 of FIG. 14 represents the transmission of a track coast command over the network to the other assets, instructing them to determine the location of the track by calculation. From block 1290, the logic flows to a block 1292, representing the storage of the track coasting calculations so that they can later be compared with sensed updates.

Other embodiments of the invention will be apparent to those skilled in the art. For example, any combination of two or more of the aspects of the invention described here may be combined to provide more sophisticated filtering. An example of this would be combining the throttling filter based on threat assessment with the kinematics prediction filter to further reduce the amount of Hostile track data released to the network. The inclusion of additional motion predictor algorithms in the motion predictor filter, conditions for uniform circular motion would require either radar provided acceleration or prediction based on two or more consecutive track updates before network traffic could be throttled.

A method according to an aspect of the invention is for transmitting target (30, for example) information between or among a plurality of platforms (16, 18, 20, 32, 36), which platforms (16, 18, 20, 32, 36) may carry sensors (32S), weapons, andor personnel. The method comprises the step of providing a communication network (N) among at least some of the platforms (16, 18, 20, 32, 36). Sensor data is generated on a first one 32) of the platforms (16, 18, 20, 32, 36), which sensor data relates to targets in a region about the platforms (16, 18, 20, 32, 36). For each target sensed, its status as hostile or friendly is determined (218, 252). Track information relating to hostile targets is transmitted over the communication network (N) at a first rate or bandwidth ($R_{hostile}$). Track information relating to friendly targets is transmitted over the communication network (N) at a second rate or bandwidth ($R_{friendly}$), less than the first rate or bandwidth ($R_{hostile}$).

A method according to another aspect of the invention is for transmitting target information between or among a plurality of platforms (16, 18, 20, 32, 36), which platforms (16, 18, 20, 32, 36) may carry sensors, weapons, andor personnel. The method comprises the step of providing a communication network (N) between or among at least some of the platforms (16, 18, 20, 32, 36). Sensor (32S) data is generated on a first one (32) of the platforms (16, 18, 20, 32, 36), which sensor data relates to targets in a region about the platforms (16, 18, 20, 32, 36). For each target sensed, its status as hostile or other than hostile is determined (218, 252, 352). For each hostile target, the time before the hostile target can attack a friendly asset is determined (354). From among the hostile target attack times, at least one of the targets is identified (356) as representing the earliest threat. Track information relating to the earliest threat is transmitted (358) over the communication network (N) at a first rate or bandwidth, and track information relating to at least some of those of the hostile targets which are other than the earliest threat are transmitted over the communication network at a second rate or bandwidth, which is less than the first rate or bandwidth.

A method according to another aspect of the invention is for transmitting target information between or among a plurality of platforms (16, 18, 20, 32, 36), which platforms may carry sensors, weapons, andor personnel. The method comprises the step of providing a communication network (N) between or among at least some of the platform (16, 18, 20, 32, 36)s. Sensor data is generated on a first one of the platform (16, 18, 20, 32, 36)s, which sensor data relates to targets in a region about the platform (16, 18, 20, 32, 36)s. For each target sensed, its status as hostile or other than hostile is determined (372). For each hostile target, the distance between the hostile target and any friendly asset is determined (374). From among the hostile target distances, at least one the targets is identified (376) as being the closest to a friendly asset. Track information relating to the target identified as being closest to a friendly asset is transmitted (378) over the communication network at a first bandwidth. Track information relating to at least some of those of the hostile targets which are other than the closest to a friendly asset are transmitted over the communication network at a second bandwidth, less than the first bandwidth.

A method for transmitting target information between or among a plurality of platform (16, 18, 20, 32, 36)s comprises the step of, on a first one of the platforms (16, 18, 20, 32, 36), recurrently generating from a local sensor first information relating to the location of at least one target other than the first one of the platforms (16, 18, 20, 32, 36). The method also includes the step of recurrently applying the first information relating to the location of the one target to a local target location predictor associated with the first one of the platforms (16, 18, 20, 32, 36), for thereby recurrently generating local target location predictions. Each first information is compared with the local target location predictions to generate a difference distance. The difference distance is compared with a threshold distance. If the difference distance is greater than the threshold difference, a track update signal including the most current first information, together with identification of the one target, is transmitted from the first platform (16, 18, 20, 32, 36) to an other platform (16, 18, 20, 32, 36). If the difference distance is less than the threshold difference, a track coast signal including at least identification of the one target is transmitted from the first platform (16, 18, 20, 32, 36) to the other platform (16, 18, 20, 32, 36). At the other platform (16, 18, 20, 32, 36), and in response to receipt of a track update signal, deeming the current location of the one target to be that in the most current first information. At the other platform (16, 18, 20, 32, 36), and in response to receipt of a track update signal including the most current first information together with identification of the one target, applying the most current first information to a remote target location predictor located on the other platform (16, 18, 20, 32, 36), to thereby generate remote target location predictions. At the other platform (16, 18, 20, 32, 36), and in response to a track coast signal identifying the one target, deeming the remote target location prediction to be the location of the one target.

What is claimed is:

1. A method for transmitting target information between or among a plurality of platforms, the platforms including at least one of sensors, weapons, and personnel, said method comprising the steps of:

providing a communication network among at least some of said platforms, said communication network defining a bandwidth;

generating sensor data on a first one of said platforms, said sensor data relating to targets in a region about said platforms;

for each target sensed, determining its status as hostile or friendly;

transmitting track information relating to hostile targets over said communication network at a first bandwidth;

transmitting track information relating to friendly targets over said communication network at a second bandwidth, less than said first bandwidth.

2. The method according to claim 1, wherein the hostile targets include at least one of known hostile targets, suspect targets and unknown targets.

3. The method according to claim 2, wherein the first bandwidth includes a first component bandwidth, a second component bandwidth, and a third component bandwidth.

4. The method according to claim 3, wherein the step of transmitting track information relating to the hostile targets includes:
   transmitting track information relating to known hostile targets over said communication network at the first component bandwidth of the first bandwidth;
   transmitting track information relating to suspect targets over said communication network at the second component bandwidth of the first bandwidth; and
   transmitting track information relating to unknown targets over said communication network at the third component bandwidth of the first bandwidth.

5. The method according to claim 4, wherein the second bandwidth is less than each of the first, second, and third component bandwidths.

6. The method according claim 4, wherein the third component bandwidth is less than the second component bandwidth, and the second component bandwidth is less than the first component bandwidth.

7. A method for transmitting target information between or among a plurality of platforms, the platforms including at least one of sensors, weapons, and personnel, said method comprising the steps of:
   providing a communication network among at least some of said platforms;
   generating sensor data on a first one of said platforms, said sensor data relating to targets in a region about said platforms;
   for each target sensed, determining its status as hostile or other than hostile;
   for each hostile target, determining the distance between said hostile target and any friendly asset;
   determining, from among said hostile target distances, at least one of said hostile targets as being the closest to a friendly asset;
   transmitting track information relating to said closest hostile target over said communication network at a first bandwidth;
   transmitting track information relating to at least some of those of said hostile targets, which are other than said closest hostile target, over said communication network at a second bandwidth, less than said first bandwidth.

8. The method according to claim 7, wherein the hostile targets include at least one of known hostile targets, suspect targets and unknown targets.

9. The method according to claim 8, wherein the first bandwidth includes a first component bandwidth, a second component bandwidth, and a third component bandwidth.

10. The method according to claim 9, wherein the step of transmitting track information relating to the closest hostile target includes:
    transmitting track information relating to a known closest hostile target over said communication network at the first component bandwidth of the first bandwidth;
    transmitting track information relating to a suspect closest target over said communication network at the second component bandwidth of the first bandwidth; and
    transmitting track information relating to an unknown closest target over said communication network at the third component bandwidth of the first bandwidth.

11. The method according to claim 10, wherein the second bandwidth is less than each of the first, second, and third component bandwidths.

12. The method according claim 10, wherein the third component bandwidth is less than the second component bandwidth, and the second component bandwidth is less than the first component bandwidth.

13. A method for transmitting target information between or among a plurality of platforms, the platforms including at least one of sensors, weapons, and personnel, said method comprising the steps of:
    on a first one of said platforms, recurrently generating from a local sensor information relating to the location of at least one target other than said first one of said platforms;
    recurrently applying said information relating to the location of said at least one target to a local target location predictor associated with said first one of said platforms, for thereby recurrently generating local target location predictions;
    comparing each information with said local target location predictions to generate difference distance;
    comparing said difference distance with a threshold distance;
    if said difference distance is greater than said threshold difference, transmitting from said first platform to another one of said platforms a track update signal including the most current information together with identification of the at least one target;
    if said difference distance is less than said threshold difference, transmitting from said first platform to said another one of said platforms a track coast signal including at least identification of the at least one target;
    at said another one of said platforms, and in response to receipt of a track update signal, deeming the current location of said at least one target to be that in said most current information;
    at said another one of said platforms, and in response to receipt of a track update signal including the most current information together with identification of the at least one target, applying said most current information to a target location predictor located on said another one of said platforms, to thereby generate remote target location predictions;
    at said another one of said platforms, and in response to a track coast signal identifying said at least one target, deeming the remote target location prediction to be the location of said one target.

14. A method for transmitting target information between or among a plurality of platforms, the platforms including at least one of sensors, weapons, and personnel, said method comprising the steps of:
    on a first one of said platforms, at a first time, generating from a local sensor first information relating to the location of at least one target other than said first one of said platforms;
    transmitting after said first time, and from said first one of said platforms to a second one of said platforms different from said first platform and from said target, a track update including identification of said at least one target, and also including associated information relating to the location of said at least one target;
    on said first one of said platforms, applying said associated information relating to the location of said at least one target to a first target location predictor, to generate a first locally predicted location of said at least one target;

on said first one of said platforms, at a second time later than said first time, generating from a local sensor second information relating to the current location of said at least one target;

on said first one of said platforms, comparing said locally predicted location of said at least one target with the current location of said at least one target, to thereby generate a difference distance;

on said first one of said platforms, comparing said difference distance to a threshold distance;

if said difference distance is greater than said threshold, transmitting from said first platform to said second one of said platforms a track update signal including the second information relating to the current location of said at least one target;

if said difference distance is less than said threshold, transmitting from said first platform to at least another one of said platforms a coast track signal at least identifying said at least one target;

at said another one of said platforms, and in response to a track update signal including said second information, deeming the location of said at least one target to be the current location of said at least one target;

at said another one of said platforms, and in response to a track update signal including associated target location information, applying the associated target location information to a second target location predictor associated with said another one of said platforms, which second target location predictor has the same characteristics as said first target location predictor, to thereby generate a remotely predicted location of said at least one target;

at said another one of said platforms, and in response to a track coast signal, deeming said remotely predicted location of said at least one target to be the current location of said at least one target.

15. A method for transmitting target information between or among a plurality of platforms, said method comprising the steps of:

comparing information relating to a location of at least one target, other than a first one of said platforms, with local target location predictions to generate difference distance;

comparing said difference distance with a threshold distance;

if said difference distance is greater than said threshold difference, transmitting from said first one of said platforms to another one of said platforms a track update signal including the most current information together with identification of the at least one target;

if said difference distance is less than said threshold difference, transmitting from said first one of said platforms to said another one of said platforms a track coast signal including at least identification of the at least one target;

at said another one of said platforms, and in response to receipt of a track update signal including the most current information together with identification of the at least one target, applying said most current information to a target location predictor located on said another one of said platforms, to generate remote target location predictions;

at said another one of said platforms, and in response to a track coast signal identifying said at least one target, deeming the remote target location prediction to be the location of said at least one target.

* * * * *